(12) United States Patent
Liang (10) Patent No.: US 12,502,086 B2
(45) Date of Patent: Dec. 23, 2025

(54) MOBILE PHONE HOLDER AND METHOD FOR DETECTING HUMAN BODY SIGNS

(71) Applicant: Luxshare Precision Industry Company Limited, Shenzhen (CN)

(72) Inventor: Kai Liang, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 281 days.

(21) Appl. No.: 18/528,298

(22) Filed: Dec. 4, 2023

(65) Prior Publication Data

US 2024/0415396 A1  Dec. 19, 2024

(30) Foreign Application Priority Data

Jun. 19, 2023 (CN) .......................... 202310734053.5

(51) Int. Cl.
*A61B 5/0205* (2006.01)
*A61B 5/00* (2006.01)
*A61B 5/024* (2006.01)
*A61B 5/1455* (2006.01)
*H04M 1/04* (2006.01)

(52) U.S. Cl.
CPC ........ *A61B 5/02055* (2013.01); *A61B 5/0008* (2013.01); *A61B 5/14552* (2013.01); *A61B 5/6898* (2013.01); *H04M 1/04* (2013.01); *A61B 5/002* (2013.01); *A61B 5/02427* (2013.01); *A61B 2560/0219* (2013.01)

(58) Field of Classification Search
CPC .............. A61B 5/02055; A61B 5/0008; A61B 5/14552; A61B 5/6898; A61B 5/002; A61B 5/02427; A61B 2560/0219; A61B 5/14542; A61B 5/14551; A61B 5/6826; H04M 1/04; H04M 1/72412; H04M 2250/12

See application file for complete search history.

(56) References Cited

FOREIGN PATENT DOCUMENTS

CN  211606571 U  9/2020

*Primary Examiner* — Jonathan T Kuo
(74) *Attorney, Agent, or Firm* — Birch, Stewart, Kolasch & Birch, LLP (57) ABSTRACT

A mobile phone holder includes a finger ring buckle and a detection module. The finger ring buckle includes a lower finger ring buckle and an upper finger ring buckle. An inner finger ring buckle is disposed in the lower finger ring buckle. A support rod is disposed in the inner finger ring buckle. The detection module mounted on the support rod includes a first detection unit, a second detection unit, a data transmission unit, and a processing unit. The first detection unit is configured to detect heart rate data and blood oxygen data. The second detection unit is configured to detect acceleration data of the detection module. The processing unit is configured to compensate the heart rate data and the blood oxygen data through the acceleration data. The data transmission unit is configured to transmit compensated heart rate data and compensated blood oxygen data to the terminal device.

18 Claims, 5 Drawing Sheets

MOBILE PHONE HOLDER AND METHOD FOR DETECTING HUMAN BODY SIGNS

CROSS-REFERENCE TO RELATED APPLICATION

This application claims priority to Chinese Patent Application No. 202310734053.5 filed Jun. 19, 2023, the disclosure of which is incorporated herein by reference in its entirety.

TECHNICAL FIELD

The present invention relates to the technical field of smart accessories, for example, a mobile phone holder and a method for detecting human body signs.

BACKGROUND

Human body sign detection generally includes detection of heart rate, blood oxygen, and body temperature. Conventional heart rate monitors typically determine the heart rate from electrocardiogram photoplethysmographic signals. Heart rate, a term for describing the cardiac cycle, refers to the number of beats per minute of the heart through detecting the first heart sound. The functions and health state of the human body may be determined by detecting the heart rate. However, conventional heart rate monitors require a user to wrap around the user's chest with a strap with electrodes while displaying the heart rate with a separate device. The preceding measurement may cause discomfort to the user, and the device is bulky and inconvenient to carry.

With the development of science and technology, smart finger ring buckles in related art have been able to monitor the health state of users. However, when a user detects heart rate and blood oxygen, jitter inevitably occurs, affecting the detection result of the heart rate and blood oxygen.

SUMMARY

The present invention provides a mobile phone holder and a method for detecting human body signs to achieve more accurate detection of heart rate and blood oxygen.

According to an aspect of the present invention, a mobile phone holder is provided. The mobile phone holder includes a finger ring buckle and a detection module.

The finger ring buckle includes an inner finger ring buckle, a lower finger ring buckle and an upper finger ring buckle. The lower finger ring buckle and the upper finger ring buckle are in an open-and-close connection. The lower finger ring buckle is configured to be fixedly bonded to a terminal device. The inner finger ring buckle is disposed in the lower finger ring buckle. A support rod is disposed in the inner finger ring buckle.

The detection module mounted on the support rod includes a first detection unit, a second detection unit, a data transmission unit, and a processing unit. The first detection unit is configured to detect heart rate data and blood oxygen data of a user. The second detection unit is configured to detect acceleration data of the detection module. The first detection unit and the second detection unit are both connected to the processing unit. The processing unit is connected to the data transmission unit and is configured to compensate the heart rate data and the blood oxygen data through the acceleration data. The data transmission unit is configured to transmit compensated heart rate data and compensated blood oxygen data to the terminal device.

In some embodiments, the inner finger ring buckle is concentrically and rotatably connected to the lower finger ring buckle.

In some embodiments, the finger ring buckle also includes a ball disposed between the inner finger ring buckle and the lower finger ring buckle.

In some embodiments, two support rods are provided and disposed in the inner finger ring buckle at intervals in parallel, and the detection module is detachably mounted on the two support rods.

In some embodiments, the detection module also includes a monitoring window disposed on the first detection unit and exposed on the upper surface of the detection module, and the first detection unit is configured to detect the heart rate data and the blood oxygen data of the user by detecting the user's finger pressed on the monitoring window.

In some embodiments, the first detection unit is a light sensor; and/or the second detection unit is an acceleration sensor.

In some embodiments, the detection module also includes a circuit board, a battery, a wireless charging coil, and a positioning magnet. The first detection unit, the second detection unit, and the data transmission unit are disposed on a first side of the circuit board. The battery is disposed on a second side of the circuit board. The wireless charging coil is disposed on the first side of the circuit board and surrounds the first detection unit, the second detection unit, and the data transmission unit. The positioning magnet is disposed between the circuit board and the wireless charging coil. The wireless charging coil is connected to the battery and is used for charging the battery. The positioning magnet is used for magnetic positioning.

In some embodiments, the detection module also includes a charging interface connected to the battery. The charging interface is used for charging the battery.

In some embodiments, the detection module also includes a third detection unit connected to the data transmission unit and configured to detect temperature data of the user.

According to another aspect of the present invention, a method for detecting human body signs of the mobile phone holder is provided. The method includes the steps described below.

Heart rate data and blood oxygen data of a user are acquired by a first detection unit. Acceleration data of a detection module are acquired by a second detection unit. A processing unit compensates the heart rate data and the blood oxygen data using the acceleration data to obtain compensated heart rate data and compensated blood oxygen data. The compensated heart rate data and the compensated blood oxygen data are transmitted to a terminal device through a data transmission unit. The terminal device displays the detection result of heart rate and blood oxygen.

BRIEF DESCRIPTION OF DRAWINGS

To illustrate solutions in embodiments of the present invention more clearly, the accompanying drawings used in the description of the embodiments are briefly described below. Apparently, the accompanying drawings described below illustrate part of embodiments of the present invention, and those of ordinary skill in the art may obtain other accompanying drawings based on the accompanying drawings described below on the premise that no creative work is done.

DETAILED DESCRIPTION

The solutions in embodiments of the present invention are described clearly and completely in conjunction with drawings in the embodiments of the present invention from which the solutions are better understood by those skilled in the art. Apparently, the embodiments described below are part, not all, of the embodiments of the present invention. Based on the embodiments described herein, all other embodiments obtained by those skilled in the art on the premise that no creative work is done are within the scope of the present invention.

It is to be noted that terms such as "first" and "second" in the description, claims, and drawings of the present invention are used to distinguish between similar objects and are not necessarily used to describe a particular order or sequence. It should be understood that the data used in this manner are interchangeable where appropriate so that the embodiments of the present invention described herein may also be implemented in a sequence not illustrated or described herein. In addition, terms "comprising", "including", and any other variations thereof are intended to encompass a non-exclusive inclusion. For example, a process, method, system, product, or device that includes a series of steps or units not only includes the expressly listed steps or units, but may also include other steps or units that are not expressly listed or are inherent to such a process, method, product, or device.

Figure 1:
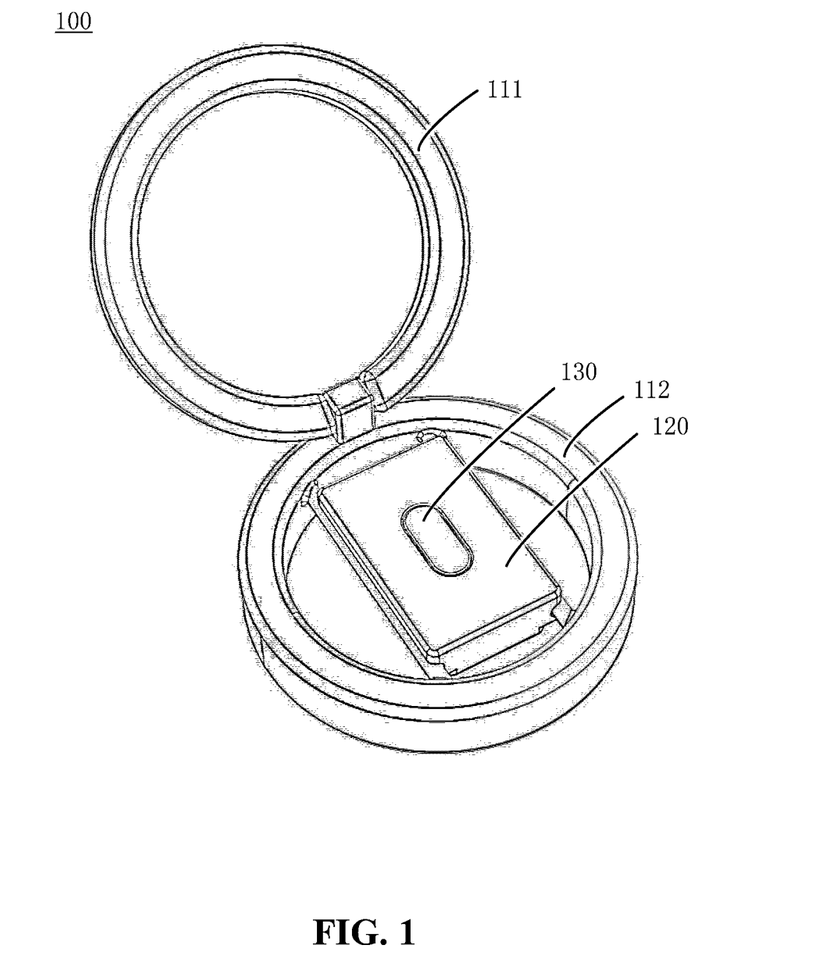
FIG. 1 is a view illustrating the structure of a mobile phone holder according to embodiments of the present invention.
Figure 2:
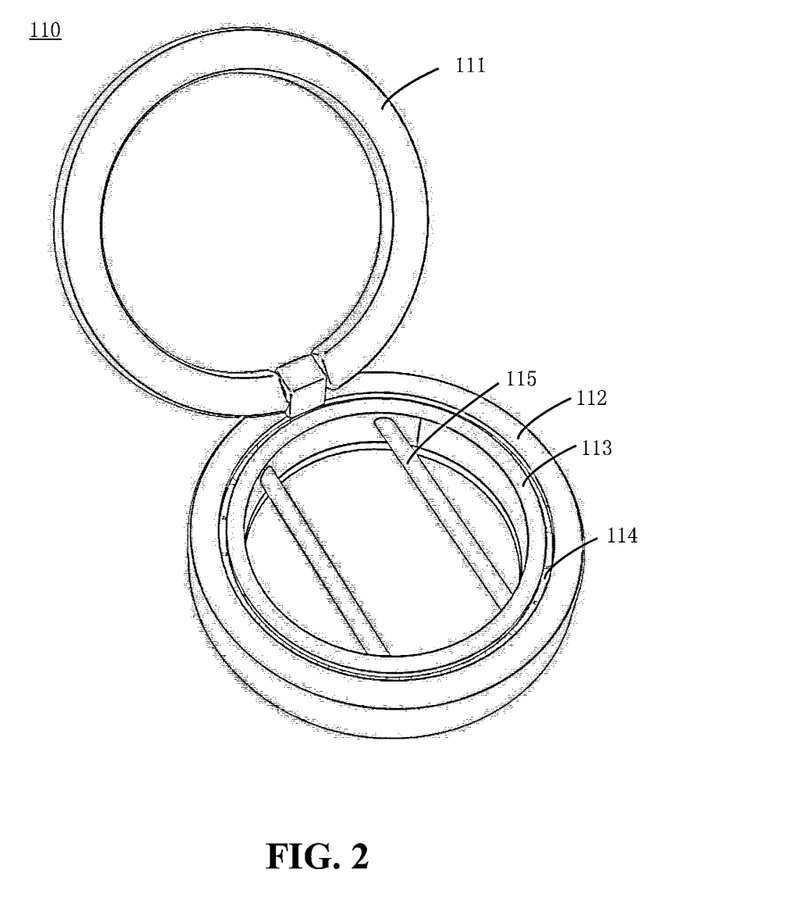
FIG. 2 is a view illustrating the structure of a finger ring buckle according to embodiments of the present invention.
Figure 3:
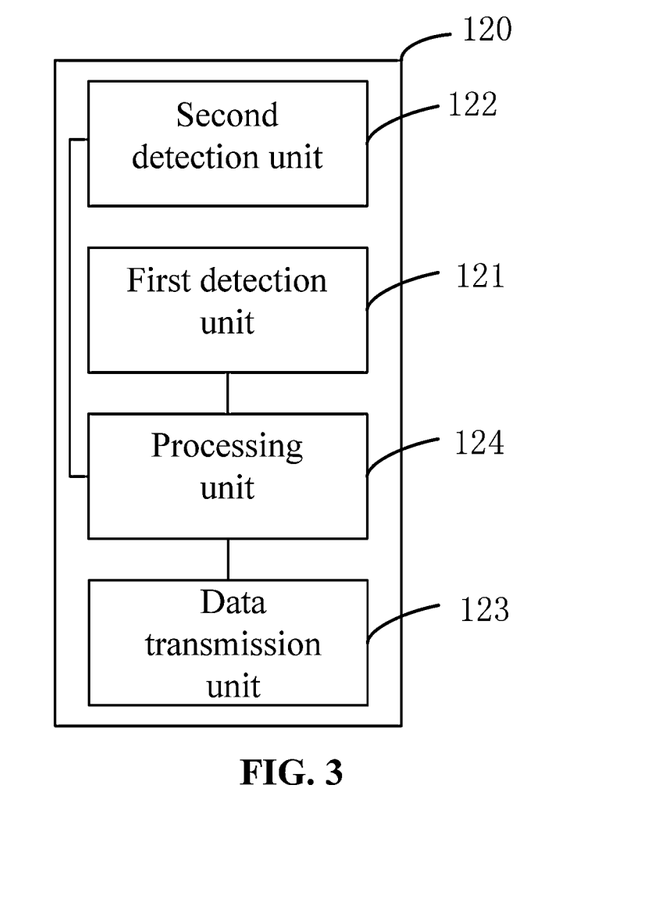
FIG. 3 is a diagram illustrating the connection relationship of a detection module according to embodiments of the present invention.

This embodiment provides a mobile phone holder capable of detecting human body signs of a user. The human body signs include, for example, blood oxygen, heart rate, and body temperature. Therefore, a new method for monitoring the health of users is provided. FIG. 1 is a view illustrating the structure of a mobile phone holder according to embodiments of the present invention. FIG. 2 is a view illustrating the structure of a finger ring buckle according to embodiments of the present invention. FIG. 3 is a diagram illustrating the connection relationship of a detection module according to embodiments of the present invention. Referring to FIG. 1, the mobile phone holder 100 includes a finger ring buckle 110 and a detection module 120.

Referring to FIG. 2, the finger ring buckle 110 includes an inner finger ring buckle 113, a lower finger ring buckle 112, and an upper finger ring buckle 111. The lower finger ring buckle 112 and the upper finger ring buckle 111 are in an open-and-close connection. The lower finger ring buckle 112 is configured to be fixedly bonded to a terminal device. The inner finger ring buckle 113 is disposed in the lower finger ring buckle 112. The inner finger ring buckle 113 is concentrically and rotatably connected to the lower finger ring buckle 112. A support rod 115 is disposed in the inner finger ring buckle 113. The detection module 120 is mounted on the support rod 115. In some embodiments, two support rods 115 are provided and disposed in the inner finger ring buckle 113 at intervals in parallel, and the detection module 120 is detachably mounted on the two support rods 115.

It is not difficult to understand that the side of the lower finger ring buckle 112 away from the upper finger ring buckle 111 may be provided with adhesive, through which the finger ring buckle 110 is fixed to the terminal device. The terminal device can be supported when the mobile phone holder 100 is fixedly bonded to the terminal device. In addition, an inner finger ring buckle 113 is disposed inside the lower finger ring buckle 112, and the inner finger ring buckle 113 and the lower finger ring buckle 112 are concentric rings. In other words, the ring centers of the inner finger ring buckle 113 and the lower finger ring buckle 112 are at the same point, and the inner finger ring buckle 113 is rotatable in the lower finger ring buckle 112.

In some embodiments, based on the preceding embodiment and with continued reference to FIG. 2, the finger ring buckle 110 also includes a ball 114 disposed between the inner finger ring buckle 113 and the lower finger ring buckle 112 so that the inner finger ring buckle 113 is concentrically rotatable in the lower finger ring buckle 112.

In some embodiments, the inner finger ring buckle 113 is provided with a groove on the side away from the ring center, the lower finger ring buckle 112 is provided with a groove on the side close to the ring center, and the ball 114 is disposed in the grooves of the inner finger ring buckle 113 and the lower finger ring buckle 112. It can be understood that the distance between the bottom of the groove of the inner finger ring buckle 113 and the bottom of the groove of the lower finger ring buckle 112 is the diameter of the ball 114. The distance from the ring center of the inner finger ring buckle 113 to a side surface of the inner finger ring buckle 113 away from the ring center is determined as the outer diameter of the inner finger ring buckle, the distance from the ring center of the lower finger ring buckle 112 to a side surface of the groove of the lower finger ring buckle 112 close to the ring center is determined as the inner diameter of the lower finger ring buckle, and the outer diameter of the inner finger ring buckle is not greater than the inner diameter of the lower finger ring buckle.

Referring to FIG. 3, the detection module 120 includes a first detection unit 121, a second detection unit 122, a data transmission unit 123, and a processing unit 124. The first detection unit 121 is configured to detect heart rate data and blood oxygen data of a user. The second detection unit is configured to detect acceleration data of the detection module 120. The first detection unit 121 and the second detection unit 122 are both connected to the processing unit 124. The processing unit 124 is connected to the data transmission unit 123 and is configured to compensate the heart rate data and the blood oxygen data through the acceleration data. The data transmission unit 123 is configured to transmit compensated heart rate data and compensated blood oxygen data to the terminal device.

It can be understood that the detection module 120 is connected to the finger ring buckle 110 in a fixed manner or a detachable manner. The detection module 120 cooperates with the terminal device to detect blood oxygen and heart rate of the user. The detection module 120 establishes a wireless connection to the terminal device through the data transmission unit 123. For example, the terminal device may be a mobile phone, and the detection module 120 and the terminal device may be connected by Bluetooth, which is not limited in this embodiment. The user sends a detection instruction to the detection module 120 through the mobile phone. The data transmission unit 123 of the detection module 120 receives the detection instruction and sends the detection instruction to the first detection unit 121 and the second detection unit 122. The first detection unit 121 detects the blood sample data and the heart rate data of the user in response to the detection instruction. In some embodiments, the detection module 120 also includes a monitoring window 130 disposed on the first detection unit 121 and exposed on the upper surface of the detection module 120, the first detection unit 121 is configured to detect the heart rate data and the blood oxygen data of the user by detecting the user's finger pressed on the monitoring window 130, and the first detection unit 121 transmits the detected heart rate data and the blood oxygen data to the processing unit 124. The first detection unit 121 may experience jitter when detecting the heart rate and the blood oxygen of the user. However, a non-stationary detection environment affects the detection result of the first detection unit 121. While the first detection unit 121 detects the heart rate and the blood oxygen of the user, the second detection unit 122 simultaneously detects the acceleration data of the terminal device and also transmits the detected acceleration data to the processing unit 124. The processing unit 124 analyzes the acceleration data detected by the second detection unit 122 and compensates the blood oxygen data and the heart rate data through the analyzed acceleration data to obtain more accurate blood oxygen data and heart rate data. The processing unit 124 transmits the more accurate blood oxygen data and heart rate data to the mobile phone through the data transmission unit 123. In addition, the detection module 120 may identify the number of movement steps of the user through the acceleration data detected by the second detection unit 122. The detection module 120 may also implement convenient functions such as page turning and photographing through the first detection unit 121 and the second detection unit 122.

In embodiments of the present invention, the detection module 120 detects blood oxygen data and heart rate data of a user through the first detection unit 121 and detects acceleration data of a terminal device through the second detection unit 122, and the processing unit 124 compensates the blood oxygen data and the heart rate data through the acceleration data and sends compensated blood oxygen data and heart rate data to the terminal device through the data transmission unit 123. In the embodiments of the invention, the blood oxygen data and the heart rate data are compensated by using the acceleration data so that the influence of jitter on the detection in the moving process of a mobile phone can be filtered out, heart rate and blood oxygen can be detected more accurately, and accurate reference data can be provided for the health monitoring of the user.

Based on the preceding embodiment, optionally, the first detection unit 121 is a light sensor; and/or the second detection unit 122 is an acceleration sensor.

The light sensor collects the heart rate data and the blood oxygen data of the user by emitting light of different wavelengths. It can be understood that when the light sensor collects the user's heart rate data and blood oxygen data, the user's finger presses on the monitoring window 130, and the light sensor collects the user's heart rate data and blood oxygen data through light of different wavelengths. In addition, the processing unit 124 converts the collected data into a heart rate waveform signal and a blood oxygen waveform signal through the photoplethysmography (PPG) algorithm, and the light sensor sends the detected heart rate waveform signal and the blood oxygen waveform signal to the processing unit 124. The light sensor may experience jitter when detecting the heart rate and blood oxygen of the user. However, a non-stationary detection environment affects the detection result of the light sensor, causing burrs in the heart rate waveform signal and the blood oxygen waveform signal collected by the light sensor. While the acceleration sensor detects the user's heart rate and the blood oxygen, the acceleration sensor simultaneously detects the acceleration data of the terminal device and transmits the detected acceleration data to the processing unit 124. The processing unit 124 analyzes the acceleration data detected by the acceleration sensor and performs weighted noise reduction on the heart rate waveform signal and the blood oxygen waveform signal through the analyzed acceleration data, thereby obtaining more accurate heart rate waveform signal and a blood oxygen waveform signal. The processing unit 124 transmits the more accurate heart rate waveform signal and blood oxygen waveform signal to the mobile phone through the data transmission unit 123. In addition, the detection module 120 may identify the number of movement steps of the user through the acceleration data detected by the acceleration sensor.

Figure 4:
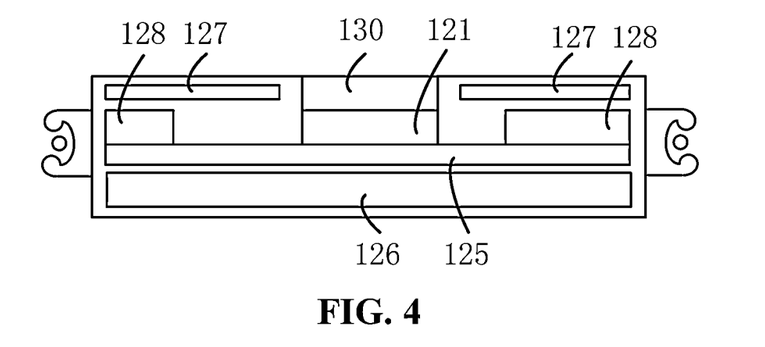
FIG. 4 is a sectional view of a detection module according to embodiments of the present invention.
Figure 5:
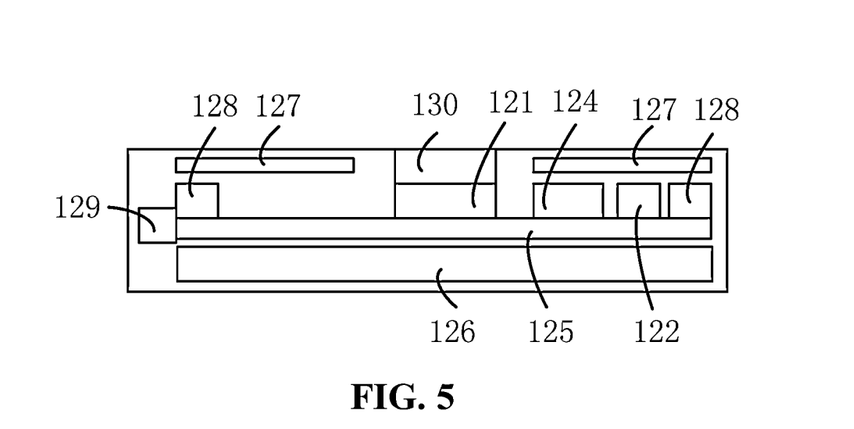
FIG. 5 is another sectional view of the detection module according to embodiments of the present invention.

FIG. 4 is a sectional view of a detection module according to embodiments of the present invention. FIG. 5 is another sectional view of the detection module according to embodiments of the present invention. In some embodiments, based on the preceding embodiments and in conjunction with FIGS. 4 and 5, the detection module 120 also includes a circuit board 125, a battery 126, a wireless charging coil 127, and a positioning magnet 128.

The first detection unit 121, the second detection unit 122, the data transmission unit 123, and the processing unit 124 are disposed on a first side of the circuit board 125. The battery 126 is disposed on a second side of the circuit board 125. The wireless charging coil 127 is disposed on a first side of the circuit board 125. The positioning magnet 128 is disposed between the circuit board 125 and the wireless charging coil 127. The wireless charging coil 127 is connected to the battery 126 and is used for charging the battery 126. The positioning magnet 128 is used for magnetic positioning. The wireless charging coil 127 surrounds the first detection unit 121, the second detection unit 122, and the data transmission unit 123.

It can be understood that the detection module 120 also includes a housing in which the first detection unit 121, the second detection unit 122, the data transmission unit 123, the processing unit 124, the circuit board 125, the battery 126, the wireless charging coil 127, and the positioning magnet 128 are all disposed. It should be noted that the detection module 120 may be in a circular, square, or other shapes. It is not difficult to understand that the first detection unit 121, the second detection unit 122, the data transmission unit 123, the processing unit 124, and the battery 126 are all electrically connected to the circuit board 125. The positioning magnet 128 is also disposed on the circuit board 125. It can be understood that the positioning magnet 128 is only in contact with the circuit board 125 and is not electrically connected to circuit board 125. When the detection module 120 is charged, the positioning magnet 128 provides accurate positioning for a wireless charger and attracts the detection module 120 to the wireless charger. It is not difficult to understand that fixing devices are disposed on two sides of the housing of the detection module 120 for fitting the detection module 120 to the support rod 115 of the finger ring buckle 110. It should be noted that the detection module 120 and the finger ring buckle 110 are assembled in a detachable mechanical manner.

Based on the preceding embodiments, in some embodiments, the detection module 120 also includes a battery 126 and a charging interface connected to the battery 126. The charging interface is used for charging the battery 126. It should be noted that the detection module 120 according to this embodiment may provide a wireless charging coil 127 for wireless charging, may provide a charging interface for wired charging, or may provide a charging interface and a wireless charging coil 127. Configuration is made according to demands in practical applications, which is not limited in this embodiment.

Based on the preceding embodiments, in some embodiments, with continued reference to FIGS. 3, 4, and 5, the detection module 120) also includes a third detection unit 129 connected to the data transmission unit 124 and configured to detect temperature data of the user. In some embodiments, the third detection unit 129 is also connected to the data transmission unit 123. When the user sends a body temperature detection instruction at the terminal device, the data transmission unit 123 receives and transmits the body temperature detection instruction to the third detection unit 129. At this time, the third detection unit 129 collects the body temperature data of the user and transmits the body temperature data to the terminal device through the data transmission unit 123. For example, the third detection unit 129 may also be connected to the processing unit 124. After collecting the body temperature data of the user, the third detection unit 129 transmits the collected body temperature data to the processing unit 124, and the processing unit 124 further processes the body temperature data and transmits the processed body temperature data to the terminal device for display through the data transmission unit 123.

For example, the third detection unit 129 may be disposed at a side edge of the circuit board 125 to facilitate the user to detect the body temperature. It can be understood that the third detection unit 129 may be an infrared temperature sensor.

Figure 6:
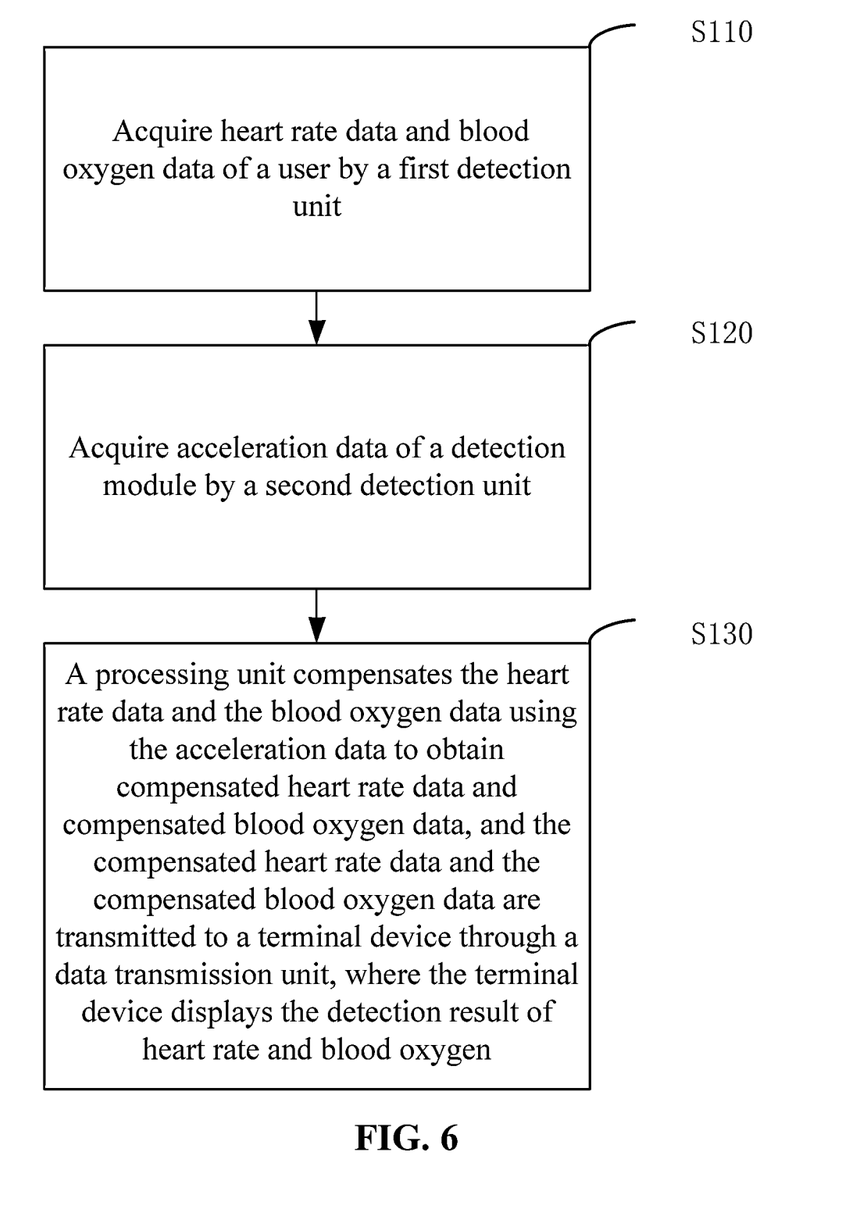
FIG. 6 is a flowchart of a method for detecting human body signs of a mobile phone holder according to embodiments of the present invention.

FIG. 6 is a flowchart of a method for detecting human body signs of a mobile phone holder according to embodiments of the present invention. Referring to FIG. 6, the method for detecting human body signs includes the steps described below:

S110: Heart rate data and blood oxygen data of a user are acquired by a first detection unit.

In some embodiments, the first detection unit receives a detection instruction of a user through a data detection unit, responds to the detection instruction, collects heart rate data and blood oxygen data of the user, and sends the collected heart rate data and the blood oxygen data to a processing unit.

S120: Acceleration data of a detection module are acquired by a second detection unit.

In some embodiments, the second detection unit receives the detection instruction of the user through the data detection unit, responds to the detection instruction, collects acceleration data of a terminal device while the user collects the heart rate data and the blood oxygen data, and transmits the acceleration data to the processing unit.

S130: A processing unit compensates the heart rate data and the blood oxygen data using the acceleration data to obtain compensated heart rate data and compensated blood oxygen data, and the compensated heart rate data and the compensated blood oxygen data are transmitted to a terminal device through a data transmission unit, where the terminal device displays the detection result of heart rate and blood oxygen.

In some embodiments, the processing unit converts the received heart rate data and blood oxygen data into a heart rate waveform signal and a blood oxygen waveform signal, performs extracting processing on the received acceleration data, and performs weighted noise reduction on the heart rate waveform signal and the blood oxygen waveform signal through the acceleration data obtained after the extracting processing, thereby acquiring the compensated heart rate data and blood oxygen data. The processing unit sends the compensated heart rate data and the compensated blood oxygen data to the data transmission unit, the data transmission unit sends the compensated heart rate data and the compensated blood oxygen data to the terminal device, and the terminal device displays the heart rate and the blood oxygen of the user.

It is to be understood that various forms of processes shown above may be adopted with steps reordered, added, or deleted. For example, the steps described in the present invention may be performed in parallel, sequentially, or in different orders, as long as the desired results of the technical solutions of the present invention can be achieved, and no limitation is imposed herein.

The preceding embodiments do not limit the scope of the present invention. It is to be understood by those skilled in the art that various modifications, combinations, sub-combinations, and substitutions may be performed according to design requirements and other factors. Any modifications, equivalent substitutions, improvements and the like made within the spirit and principle of the present invention are within the scope of the present invention.

What is claimed is:

1. A mobile phone holder, comprising: a finger ring buckle and a detection module;
    wherein the finger ring buckle comprises an inner finger ring buckle, a lower finger ring buckle, and an upper finger ring buckle, the lower finger ring buckle and the upper finger ring buckle are in an open-and-close connection, the lower finger ring buckle is configured to be fixedly bonded to a terminal device, the inner finger ring buckle is disposed in the lower finger ring buckle, and a support rod is disposed in the inner finger ring buckle; and
    wherein the detection module is mounted on the support rod, and comprises a first detection unit, a second detection unit, a data transmission unit, and a processing unit; wherein the first detection unit is configured to detect heart rate data and blood oxygen data of a user, the second detection unit is configured to detect acceleration data of the detection module, the first detection unit and the second detection unit are both connected to the processing unit, the processing unit is connected to the data transmission unit and is configured to compensate the heart rate data and the blood oxygen data through the acceleration data, and the data transmission unit is configured to transmit compensated heart rate data and compensated blood oxygen data to the terminal device.

2. The mobile phone holder of claim 1, wherein the inner finger ring buckle is concentrically and rotatably connected to the lower finger ring buckle.

3. The mobile phone holder of claim 2, wherein the finger ring buckle further comprises a ball disposed between the inner finger ring buckle and the lower finger ring buckle.

4. The mobile phone holder of claim 2, wherein two support rods are provided and disposed in the inner finger ring buckle at intervals in parallel, and the detection module is detachably mounted on the two support rods.

5. The mobile phone holder of claim 1, wherein the detection module further comprises a monitoring window disposed on the first detection unit and exposed on an upper surface of the detection module, and the first detection unit is configured to detect the heart rate data and the blood oxygen data of the user by detecting the user's finger pressed on the monitoring window.

6. The mobile phone holder of claim 5, wherein the first detection unit is a light sensor;
and/or the second detection unit is an acceleration sensor.

7. The mobile phone holder of claim 5, wherein the detection module further comprises a circuit board, a battery, a wireless charging coil, and a positioning magnet, wherein the first detection unit, the second detection unit, and the data transmission unit are disposed on a first side of the circuit board, the battery is disposed on a second side of the circuit board, the wireless charging coil is disposed on the first side of the circuit board and surrounds the first detection unit, the second detection unit, and the data transmission unit, the positioning magnet is disposed between the circuit board and the wireless charging coil, and the wireless charging coil is connected to the battery.

8. The mobile phone holder of claim 7, wherein the detection module further comprises a charging interface connected to the battery.

9. The mobile phone holder of claim 1, wherein the detection module further comprises a third detection unit connected to the data transmission unit and configured to detect temperature data of the user.

10. A method for detecting human body signs according to a mobile phone holder, comprising:
acquiring heart rate data and blood oxygen data of a user by a first detection unit;
acquiring acceleration data of a detection module by a second detection unit; and
compensating, by a processing unit, the heart rate data and the blood oxygen data using the acceleration data to obtain compensated heart rate data and compensated blood oxygen data, and transmitting the compensated heart rate data and the compensated blood oxygen data to a terminal device through a data transmission unit, wherein the terminal device displays a detection result of heart rate and blood oxygen, wherein the mobile phone holder comprises a finger ring buckle and a detection module;
wherein the finger ring buckle comprises an inner finger ring buckle, a lower finger ring buckle, and an upper finger ring buckle, the lower finger ring buckle and the upper finger ring buckle are in an open-and-close connection, the lower finger ring buckle is configured to be fixedly bonded to the terminal device, the inner finger ring buckle is disposed in the lower finger ring buckle, and a support rod is disposed in the inner finger ring buckle; and wherein the detection module is mounted on the support rod, and comprises the first detection unit, the second detection unit, the data transmission unit, and the processing unit; wherein the first detection unit and the second detection unit are both connected to the processing unit, the processing unit is connected to the data transmission unit.

11. The method for detecting human body signs of claim 10, wherein the inner finger ring buckle is concentrically and rotatably connected to the lower finger ring buckle.

12. The method for detecting human body signs of claim 11, wherein the finger ring buckle further comprises a ball disposed between the inner finger ring buckle and the lower finger ring buckle.

13. The method for detecting human body signs of claim 11, wherein two support rods are provided and disposed in the inner finger ring buckle at intervals in parallel, and the detection module is detachably mounted on the two support rods.

14. The method for detecting human body signs of claim 10, wherein the detection module further comprises a monitoring window disposed on the first detection unit and exposed on an upper surface of the detection module, and the first detection unit is configured to detect the heart rate data and the blood oxygen data of the user by detecting the user's finger pressed on the monitoring window.

15. The method for detecting human body signs of claim 14, wherein the first detection unit is a light sensor;
and/or the second detection unit is an acceleration sensor.

16. The method for detecting human body signs of claim 14, wherein the detection module further comprises a circuit board, a battery, a wireless charging coil, and a positioning magnet, wherein the first detection unit, the second detection unit, and the data transmission unit are disposed on a first side of the circuit board, the battery is disposed on a second side of the circuit board, the wireless charging coil is disposed on the first side of the circuit board and surrounds the first detection unit, the second detection unit, and the data transmission unit, the positioning magnet is disposed between the circuit board and the wireless charging coil, and the wireless charging coil is connected to the battery.

17. The method for detecting human body signs of claim 16, wherein the detection module further comprises a charging interface connected to the battery.

18. The method for detecting human body signs of claim 10, wherein the detection module further comprises a third detection unit connected to the data transmission unit and configured to detect temperature data of the user.

* * * * *